July 6, 1965

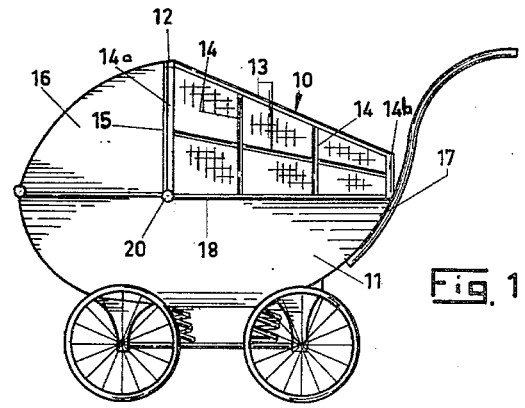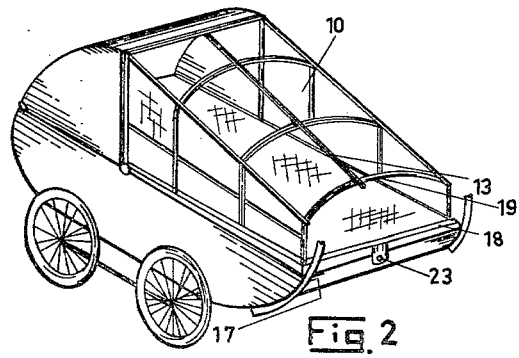

R. C. HINES 3,193,322

BABY CARRIAGE COVER

Filed July 3, 1961

INVENTOR

Ruth C. Hines

… … …

United States Patent Office 3,193,322
Patented July 6, 1965

3,193,322
BABY CARRIAGE COVER
Ruth C. Hines, 20 Fenside Drive, Don Mills, Ontario, Canada
Filed July 3, 1961, Ser. No. 121,694
1 Claim. (Cl. 296—78.1)

This invention relates to improvements in accessories for baby carriages and more particularly to improvements in baby carriage covers.

It is conventional practice to equip baby carriages with storm fronts which partially cover the vertical opening of the hood, having the disadvantages that they are only partially effective in keeping out rain or the like in bad weather and are impractical in hot weather, causing high temperatures inside the carriage and permitting the ingress of insects and the like.

It is also a disadvantage of this type of protector that it is easily undone so that young and irresponsible children may easily gain access to the baby or, at least, drop foreign objects into the carriage.

Other types of protection in the form of storm aprons, mosquito netting or the like are attached to the carriage, usually about the periphery of the opening and still have the disadvantage they are easily removable.

For this reason it is usually deemed necessary to strap the baby into the carriage, thereby restricting his or her movement to a very large degree. Further disadvantages of the covers of the prior art is that, by stretching straight across the opening of the carriage and hood, larger more active babies are unable to kick freely or fully stretch their arms upwardly.

Yet another disadvantage of prior covers is that they are of soft material only, so that in the event of a heavy object falling thereon or an animal jumping thereon, the baby may be injured and, especially in the event of large cats or the like jumping into the carriage, there is also a danger of suffocation.

It is an object of the present invention to provide a baby carriage cover, hereafter known as a cover, that will afford full protection for a baby lying in the carriage.

It is yet another object of this invention to provide a cover which may be locked into place thereby preventing unauthorized persons gaining access to the baby.

It is still another object of this invention to provide a cover which will permit a baby full freedom of movement.

It is still another object of this invention to provide a cover which will enable a baby to be retained within the carriage without the need of restraining straps.

It is another object of this invention to provide a cover which, by varying the material of which it is made, may be utilized in any climate.

It is still a further object of this invention to provide a cover having a framework which may support other temporary covers such as for instance, a cover embodying a screen fabric may be protected by a blanket or the like in order to keep out drafts from sudden breezes.

It is still another object of this invention to provide a cover which may remain permanently with the baby carriage.

A further object of this invention is to provide a cover which may be quickly and easily removed from the baby carriage if so desired and utilized as a swing or cradle or the like.

It is yet another object of this invention to provide a cover which may be fitted to any standard baby carriage without modification of the carriage.

It is a further object of this invention to provide a cover having a framework and a covering material which may be detachably attached thereto, differing materials being utilized for different temperatures and conditions thereby enabling the cover to be used at all times with the minimum amount of extra equipment and expense.

These and other objects and features of this invention will become apparent when taken in conjunction with the accompanying drawings in which:

FIG. 1 is a perspective view of a cover embodying the present invention shown in location on the baby carriage.

FIG. 2 is an end view of the cover as shown in FIG. 1 illustrating one method of locking the cover in place.

Figure 3:
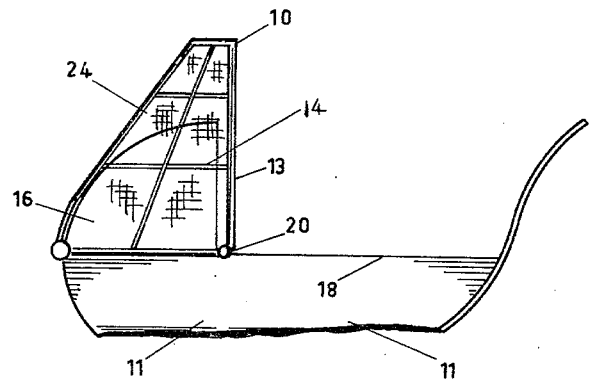
FIG. 3 is a perspective view of the cover as illustrated in FIG. 1 upon being unlocked and raised to permit access to the interior of the baby carriage.

Referring to FIG. 1, a carriage cover 10 is shown in location upon a baby carriage 11. Cover 10 comprises a framework 12 having a plurality of longitudinal members 13 held in spaced apart relationship by a plurality of ribs 14.

Ribs 14 are in parallel, spaced apart relationship and diminish progressively in size, the largest rib 14a being adapted to match the perimeter of the open frame 15 of the hood 16 of carriage 11, the smallest rib 14b being adjacent the front wall 17 of carriage 11.

Referring to FIG. 3, it will be noted that the lowest longitudinal members 13 are adapted to lie contiguously with the upper edge 18 of carriage 11 and a transverse member 19 is also adapted to lie contiguously with the upper edge of front wall 17 of carriage 11.

It will be noted that the lowest longitudinal members 13 meet the ends of the largest rib 14a substantially at right angles and at their junction point 20 a hole is suitably formed therethrough to permit framework 12 to be pivotally joined to carriage 11 utilizing the existing hood attachment pivots.

In the closed position as illustrated, cover 10 may be locked in position by means of any conventional locking mechanism such as a releasable catch 23 as shown in FIG. 2.

Referring to FIG. 3, upon desiring access to the interior of carriage 11, catch 23 as illustrated in FIG. 2 may be released, and framework 12 moved arcuately upwardly, pivoting about the corners 20 and, therefore, the members 13, which are contiguous with the upper edge 18 of carriage 11, are now substantially vertical and the interior of the carriage is accessible.

In all the above drawings a mesh material 24 is shown stretched over framework 12 and secured thereto in a conventional manner however this should in no way restrict the scope of the invention which permits a wide variety of materials to be utilized over framework 12.

Framework 12 may be fabricated in any light, rigid material such as aluminum tubing so that even should a heavy weight fall thereon or an animal jump thereon, framework 12 will support the weight and protect the baby from injury or even suffocation.

It should also be noted that catch 23 may take the form of a padlock assembly if so desired to prevent unauthorized persons from handling the baby who would normally be able to unfasten any other conventional catch 23.

Furthermore, upon cover 10 being locked in location as illustrated in FIGS. 1 and 2, a baby may be permitted to remain within carriage 11 in perfect safety without the need for restricting straps.

Figure 4:
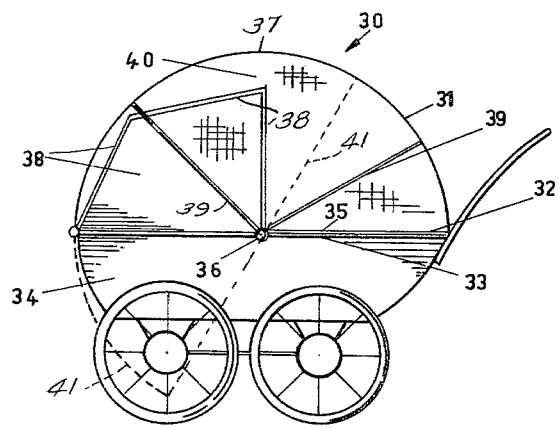
FIG. 4 is a side elevation of an alternative configuration of a cover embodying the present invention shown fully located upon a baby carriage and locked in place and, in phantom, the position adopted by this modified cover upon being unlocked and raised to permit access to the interior of the carriage.

Referring to FIG. 4, an alternative configuration of the carriage cover 30 is illustrated in which the framework 31 thereof. The longitudinal members 35 are suitably holed in contiguous relationship with the upper edge 33 of a carriage 34 and extending around the whole perimeter thereof. The longitudinal members 25 are suitably holed centrally thereof to be pivotally attached to the hood fitting 36 of carriage 34.

A plurality of longitudinal members 37 arcuately span the length of frame 32 and extend to a sufficient height above longitudinal members 35 to permit the hood portion of carriage 34 to be in its fully extended position if so required. A plurality of parallel, spaced apart ribs 39 interconnect longitudinal members 37 and longitudinal members 35 so that any one of a number of materials 40 may be detachably attached to frame 31 to provide similar protection for an infant within the carriage 34 as previously explained.

An additional advantage of cover 30 lies in the fact that, since arcuate longitudinal members 37 span the entire open portion of the baby carriage defined by upper perimeter 33 thereof, hood 38 of carriage 34 may be in its fully folded position while full protection is still afforded to the baby within the carriage. Cover 30 may be locked upon carriage 34 in a manner similar to that described in FIG. 2 and, in order to gain access to the interior of carriage 34 the locking device may be released and the cover 30 raised arcuately until the cover 30 assumes the position shown in phantom at 41.

It should be noted that this particular configuration is particularly advantageous in hot weather when material 40 may comprise mosquito netting and the baby allowed to lie in carriage 34 under trees or the like, enjoying full benefit from the shade without the annoyance from insects and without danger of interference by animals.

It should also be noted that in either configuration as herein illustrated, covers 10 and 30 may be completely removed from their respective carriages and, being of relatively strong but light frameworks, they may be utilized as emergency cribs during long trips or they may also be utilized to cover or partially cover a baby when the infant is lying upon a car seat. Furthermore, in this application, a blanket may be draped over the framework so that the other occupants of the car may enjoy having the windows open without danger of the baby being in a draft.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

A cover for baby carriages having an upper open perimeter; and a hood covering part of said perimeter of said baby carriage, said cover extending over the full upper perimeter of said baby carriage; said cover being large enough to clear said hood, said cover comprising a frame of longitudinal members spaced apart by transverse members, said frame fastened pivotally to said baby carriage, at a point whereby said cover can be swung back and forth over said baby carriage, said cover to consist of a covering of translucent matter permanently fastened to said frame.

References Cited by the Examiner

UNITED STATES PATENTS

| | | | |
|---|---|---|---|
| 1,143,774 | 6/15 | Nicholls | 296—110 X |
| 1,233,032 | 7/17 | Cooley | 296—78 X |
| 1,257,206 | 2/18 | Fernbach | 296—78 X |
| 2,193,469 | 3/40 | Ashton | 296—78 X |

FOREIGN PATENTS 228,240  1/25  Great Britain.

A. HARRY LEVY, *Primary Examiner.*

PHILIP ARNOLD, *Examiner.*